(12) United States Patent
Di Guardo et al.

(10) Patent No.: US 7,973,519 B2
(45) Date of Patent: *Jul. 5, 2011

(54) DEVICE FOR TRANSFORMING A PRIMARY AC VOLTAGE IN A LOWER AC VOLTAGE IN A LOWER AC VOLTAGE FOR SUPPLYING AN ELECTRICAL LOAD

(75) Inventors: Mario Di Guardo, Gravina di Catania (IT); Giovanni Mangraviti, Messina (IT)

(73) Assignee: STMicroelectronics S.r.l., Agrate Brianza (MI) (IT)

( * ) Notice: Subject to any disclaimer, the term of this patent is extended or adjusted under 35 U.S.C. 154(b) by 651 days.

This patent is subject to a terminal disclaimer.

(21) Appl. No.: 12/058,020

(22) Filed: Mar. 28, 2008

(65) Prior Publication Data

US 2008/0239769 A1 Oct. 2, 2008

(30) Foreign Application Priority Data

Mar. 30, 2007 (IT) .............................. VA2007A0038

(51) Int. Cl.
*G05F 1/40* (2006.01)
(52) U.S. Cl. ....................................... 323/239; 323/324
(58) Field of Classification Search ................... 363/34, 363/37, 62, 65; 323/239, 324
See application file for complete search history.

(56) References Cited

U.S. PATENT DOCUMENTS

| | | | | |
|---|---|---|---|---|
| 5,932,934 A | * | 8/1999 | Hofstetter et al. | 307/26 |
| 6,366,062 B2 | * | 4/2002 | Baretich et al. | 323/223 |
| 7,288,904 B2 | * | 10/2007 | Numeroli et al. | 315/312 |
| 7,688,044 B2 | * | 3/2010 | Di Guardo et al. | 323/225 |
| 7,696,730 B2 | * | 4/2010 | Tamai et al. | 323/217 |
| 7,786,709 B2 | * | 8/2010 | Lawson et al. | 323/206 |
| 7,816,814 B1 | * | 10/2010 | Hennessy et al. | 307/112 |

* cited by examiner

*Primary Examiner* — Adolf Berhane
(74) *Attorney, Agent, or Firm* — Lisa K. Jorgenson; Allen, Dyer, Doppelt, Milbrath & Gilchrist, P.A.

(57) ABSTRACT

A device for transforming an AC voltage to a lower AC voltage includes a generator of a PWM control signal and a first bidirectional switch to couple a load to the AC voltage during a conduction-phase. A second bidirectional switch discharges energy from the load during an off-phase of the first bidirectional switch. A first driving circuit of the first bidirectional switch is input with the PWM control signal and generates a first PWM signal, applied between control and conduction terminals of the first bidirectional switch. A second driving circuit for the second bidirectional switch is input with the PWM control signal and generates a second PWM signal, in phase opposition to the first PWM signal, applied between control and conduction terminals of the second bidirectional switch. An electric decoupling circuit is between the generator and second driving circuit. A transformer is between respective conduction terminals of the bidirectional switches.

18 Claims, 7 Drawing Sheets

DEVICE FOR TRANSFORMING A PRIMARY AC VOLTAGE IN A LOWER AC VOLTAGE IN A LOWER AC VOLTAGE FOR SUPPLYING AN ELECTRICAL LOAD

FIELD OF THE INVENTION

This invention relates to a device for converting an AC voltage to a lower AC voltage for supplying and/or controlling an AC load.

The invention relates more particularly, but not exclusively, to an AC voltage adaptor to be interposed between an AC voltage source and the supply nodes of an electric load functioning at a lower AC voltage than the source voltage.

BACKGROUND OF THE INVENTION

Due to well known reasons of effectiveness and limitation of disturbances due to power distribution mains, PWM switching converters may be preferable to traditional methods of regulation of AC motors and of other resistive-inductive loads, sampling the phase of the main sinusoidal voltage by controlling the conduction angle of a thyristor. These PWM switching regulators operate at relatively larger switching frequencies (in the order of tenths of thousands of Herz) than the relatively low frequency of the mains (typically of 50 or 60 Herz).

Nevertheless, even if PWM inverters designed for reducing the harmonic content of the currents absorbed by a nonlinear load have been developed, the need to respect the rules for limiting the harmonic content injected over distribution mains, mainly caused by the preliminary AC-DC conversion carried out by rectifiers that determine a relevant harmonic distortion of the current absorbed from the network, may impose the introduction of a power factor correction circuit (PFC) between the mains and the inverter.

The circuit disclosed in the European patent application EP 1,304,792 in the name of the same Applicant, discloses an AC-AC converter including a double chopper, capable of directly coupling the load to the sinusoidal voltage of the mains without carrying out a preliminary AC-DC conversion, thus avoiding issues of harmonic distortion of the current absorbed from the mains suffered by traditional AC-DC-AC converters, For a correct functioning of the two choppers in case of inductive load, the circuit must be capable of powering the load starting from any level of the AC voltage of the mains and of allowing demagnetization of the inductance of the load through an efficient recirculation path of the discharge current.

Figure 1:
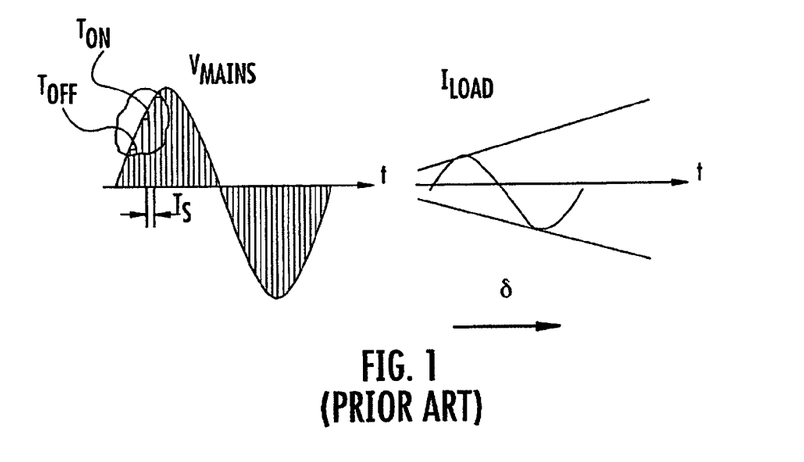
FIG. 1 depicts, as already described, a bidirectional PWM chopping of an AC voltage.

As disclosed in the above identified patent application, the disclosure of which is hereby incorporated by reference in its entirety, if the chopper function (re: FIG. 1) is applied to the full sinusoidal waveform of the mains voltage, an AC current flows through the load. This current has the same shape of the waveform that would circulate if the load were connected directly to the electric mains. This means that if the shape of the original current is a sinusoid, the current, regulated through the PWM switching control of the power-on switches of the load and of the discharge switches of the inductance, is also sinusoidal.

Neglecting power losses in electronic devices, the circuit is such that the input (supplied) power S of the circuit equals the output (delivered) power:

$$S = V_{AC(rms)} I_{AC(rms)} = V_{LOAD(rms)} I_{LOAD(rms)}$$

and that the currents satisfy the following relation:

$$\frac{I_{LOAD(rms)}}{I_{AC(rms)}} = \frac{V_{AC(rms)}}{V_{LOAD(rms)}}$$

wherein $V_{AC}$ and $I_{AC}$ represent the input voltage and the input current, respectively, and $V_{LOAD}$ and $I_{LOAD}$ are the output voltage and the output current of the converter, respectively, that are supplied to the load.

The circuit functions as a converter, particularly as an AC-AC converter, and in practice as a classic transformer. Having fixed the power to be transferred, it is possible to have a load current larger than that $I_{AC}$ of the mains, because the output voltage is lower than the mains voltage.

Theoretically, there is no limitation on the type of load, it may work with any resistive, inductive and/or capacitive load, even with relevant out-of-phase angles. Nevertheless, the particular circuit topology and the way the two switches are controlled may call for a synchronization between the turning off of a switch and the turning on of its complementary switch.

Because the output filter and/or the load is inductive, the current that flows through the switches may not be interrupted instantaneously, otherwise large voltage swings capable of worsening the reliability and compromising the correct functioning of the system may be generated.

According to Lenz's law:

$$e = -L\frac{dI}{dt}$$

an abrupt variation of the current (that is if the time derivative of the current is relatively large) causes an induced electromotive force in the inductance L that may damage the switches. Therefore, the electric path of the load current may helpfully be switched from a switch to the other without interruptions.

On the other hand, a short superposition of turn on phases of the two switches, that causes a so-called "cross conduction," would short-circuit the supply to ground. In a DC-AC converter that uses switches driven with complementary signals, dead time may be inserted between the turn off of a switch and the turning on of its complementary switch, during which both switches are turned off, to reduce cross conduction.

During the above dead times, the inductive currents flow freely through free-wheeling diodes normally integrated in the power devices. Because of the functioning of the AC-AC converter of the double chopper system, that may be defined as "bidirectional" because it works on both positive and negative half-waves, recirculation of discharge current of the reactive energy stored in the load and/or in the low-pass output filter during the disconnection phase of the load from the AC source may not occur through the intrinsic diode of the integrated structure of the power device, but may take place by turning on immediately the second switch, dedicated for this purpose.

This feature of a transformer circuit or of a switching AC-AC transformerless converter may cause designers to adopt compromises that restrict the field of possible applications in order to ensure a sufficient reliability.

SUMMARY OF THE INVENTION

These limitations and critical aspects are addressed by the device of this invention.

Through a magnetic coupling of the source or emitter circuits, respectively in case as power switches are used MOS or IGBT transistors, which may be referred to as conduction terminals, and similarly gates and bases may be referred to as control terminals, it is possible to create an effective current feedback between the two circuits that conduct in phase opposition, so that the voltage induced by the current flowing in one circuit during a turn on transient of the related switch delays the turn on of the switch of the other circuit and produces an outstanding reduction of the residual current peaks in correspondence of the switching transients of the two complementary switches.

The galvanic insulation between the two complementary PWM driving signals of the two switches allows both switches to be correctly driven. Indeed, the source or emitter terminal of the free-wheeling switch of the discharge current is not grounded, but it is left floating.

DETAILED DESCRIPTION OF THE PREFERRED EMBODIMENTS

Sample embodiments of a transformerless AC-AC converter of this approach are described hereinafter for highlighting the various details and making even easier a comprehension of how the present approach can be practiced. Any skilled person will recognize that the approach can be carried out even without some of the features of the illustrated examples, or using other devices, components and materials. Some circuit architectures, ancillary devices and the like are not described in detail to better focus on the features.

Certain mathematical relations that describe the functioning of a transformerless AC-AC converters are the following:

$$v_{LOAD}(t) = \delta \times v_{AC}(t) = \delta \times V_{MAX} \times \sin(\omega t)$$

$$i_{LOAD}(t) = \frac{1}{\delta} \times i_{AC}(t) = \frac{1}{\delta} \times I_{MAX} \times \sin(\omega t + \varphi)$$

wherein $\delta$ is the duty-cycle of the PWM switching control signal, defined by the following equation:

$$\delta = \frac{ton}{ton + toff} = \frac{ton}{Ts}$$

Ts being the fixed switching period of the PWM control signal and $\varphi$ is the phase angle (outphasing) between voltage and current.

Figure 2:
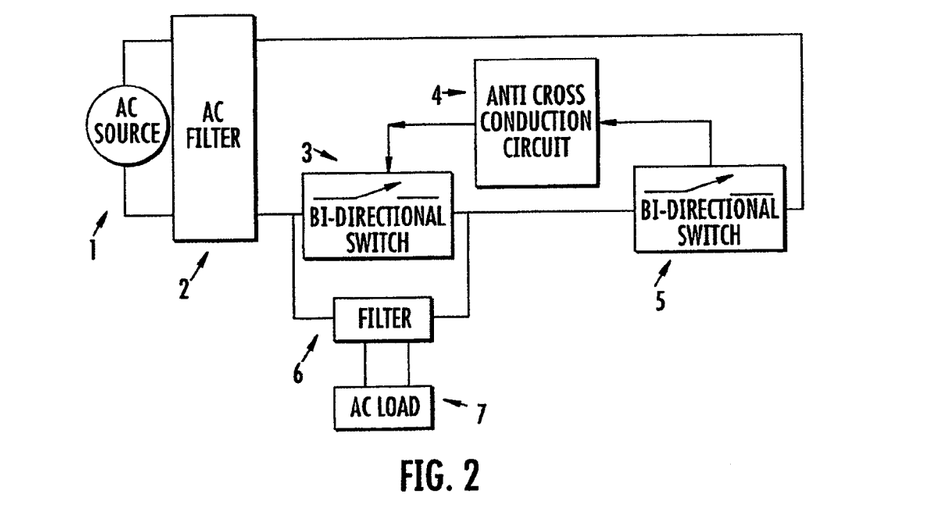
FIG. 2 is a functional block diagram of a transformer, in accordance with the present invention.

FIG. 2 is a functional block diagram of a transforming device of this approach, having a dedicated block 4 to reduce cross conduction phenomena.

Figure 3:
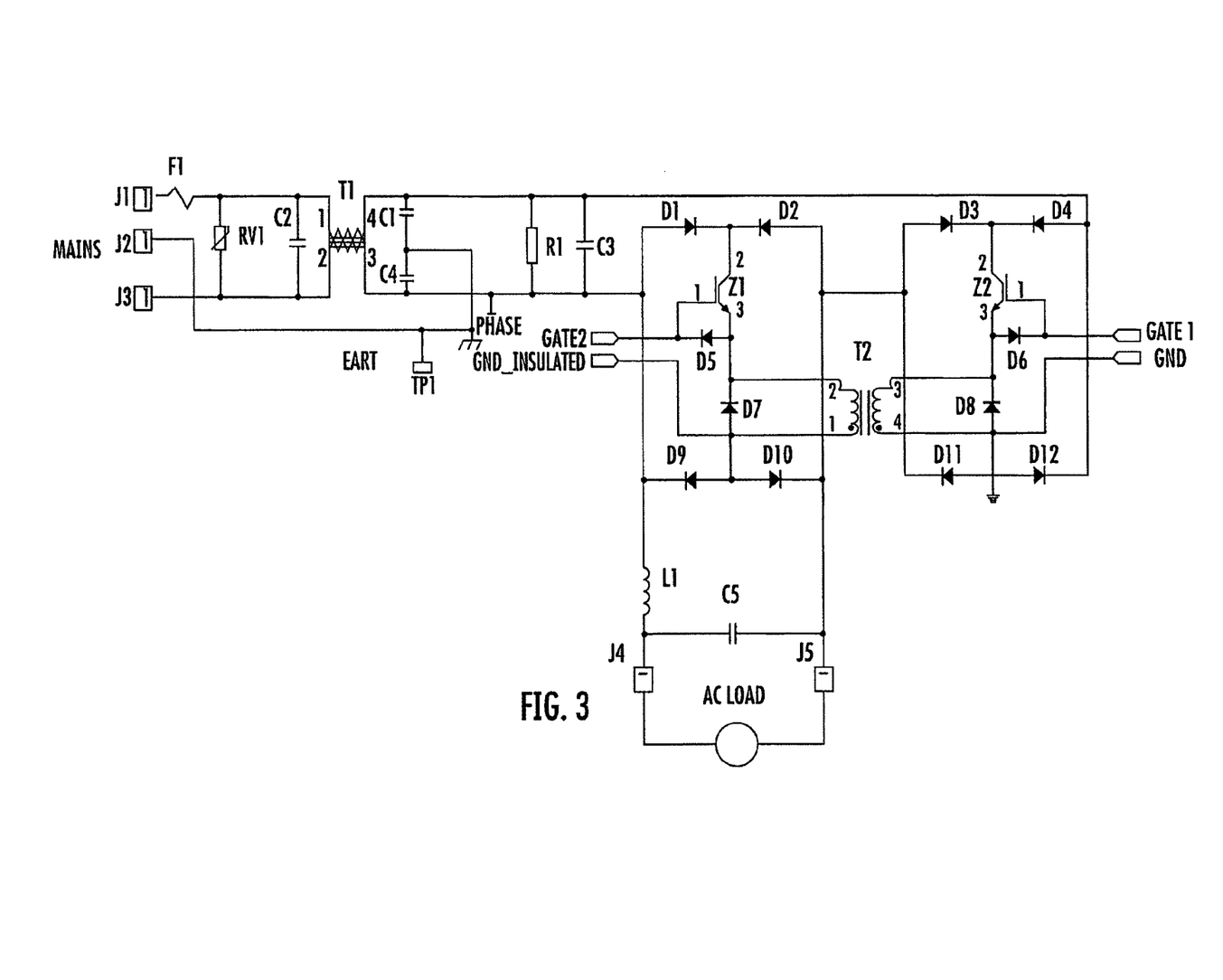
FIG. 3 is a circuit scheme of an embodiment of an AC-AC converter, in accordance with the present invention.

FIG. 3 is the circuit embodiment of a sample embodiment of an AC-AC converter according to this approach.

In the circuit of FIG. 3 there are conceptually two main blocks functioning as bidirectional switches. The rightmost block, including the unidirectional switch Z2 and the diodes D3, D4, D11, D12 is for powering of the load inductance during Ton phases of the PWM driving signal Gate1. The leftmost block, including the unidirectional switch Z1 and of the diodes D1, D2, D9, D10 is for recirculating the discharge current of the inductance, during Toff phases of the PWM driving signal Gate2.

The diodes should have a small recovery time because they are driven by high frequency PWM signals. IGBT or power MOS may be used indifferently as switches Z1 and Z2. The switches Z1 and Z2 may be turned on and off in a complementary manner, because simultaneous conduction of two switches would short the supply to ground.

Therefore, Z2 (that is the power-on switch) is controlled by the PWM signal generated by an appropriate PWM generator, and Z1 (free-wheeling switch) is controlled by a complementary signal (inverted replica) of the first PWM signal.

The four diodes in each respective block make possible the functioning of a normal unidirectional switch (power MOS or IGBT) with AC currents, realizing in practice a bidirectional switch.

Let us assume that the system, because of the diode bridges associated to two monodirectional switches Z1 and Z2, may operate indifferently and symmetrically for positive and negative currents and voltages. In order to explain the functioning of an AC-AC converter, let us assume a time instant T in which the mains voltage is positive and nonnull.

Figure 4:
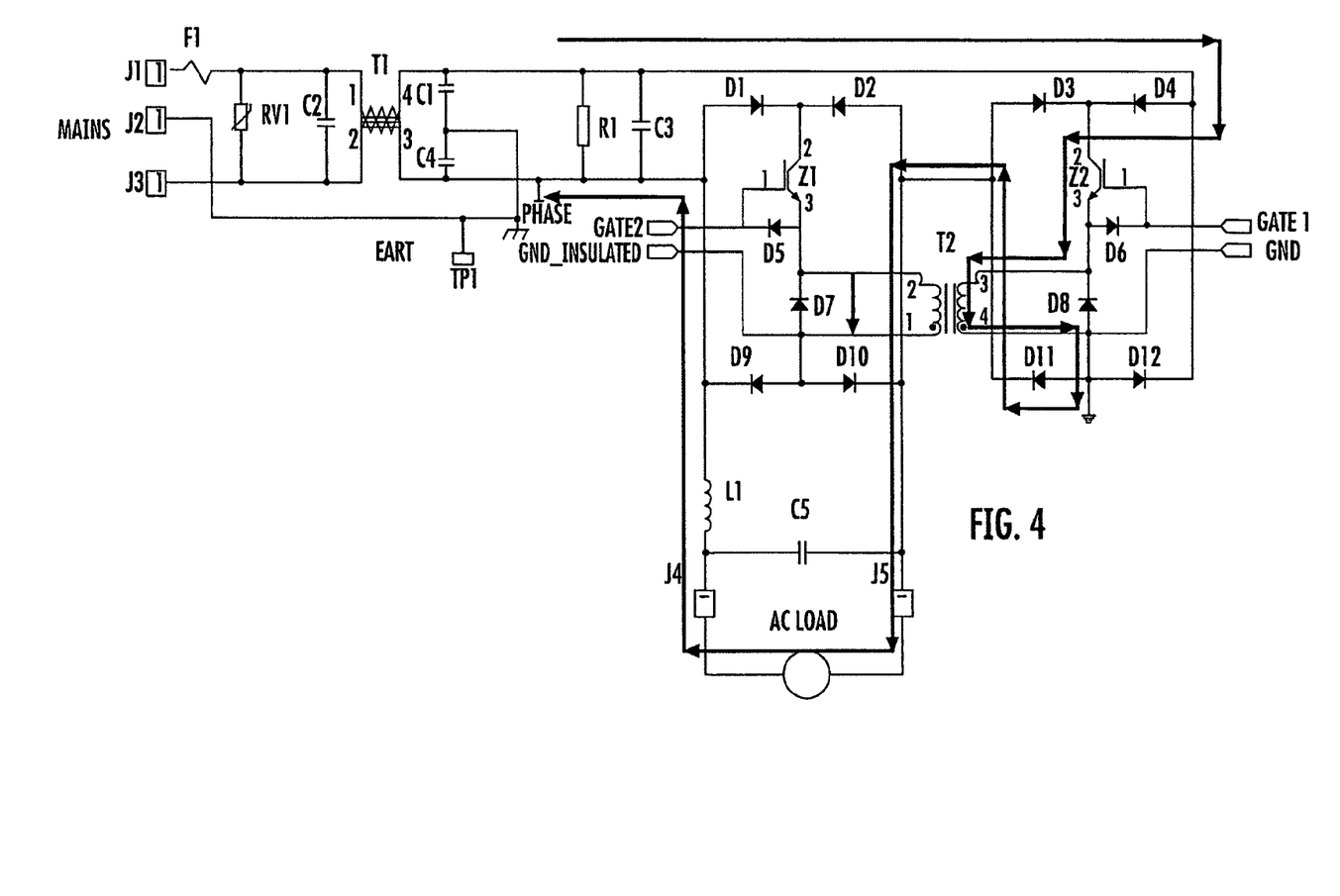
FIG. 4 depicts a current path during Ton phases for powering the load, in accordance with the present invention.

By looking at FIG. 4, during the Ton phase, in which the PWM signal is high, the switch Z2 is in a conduction state and the current along the path identified by the arrows (during the positive halfwave) supplies the load by powering L1 and/or the inductive portion of the load. It is evident the alternative current path during the negative halfwave of the input voltage. In this phase, being Z1 off, current may not flow through the respective diode bridge D1, D2, D9, D10.

Figure 5:
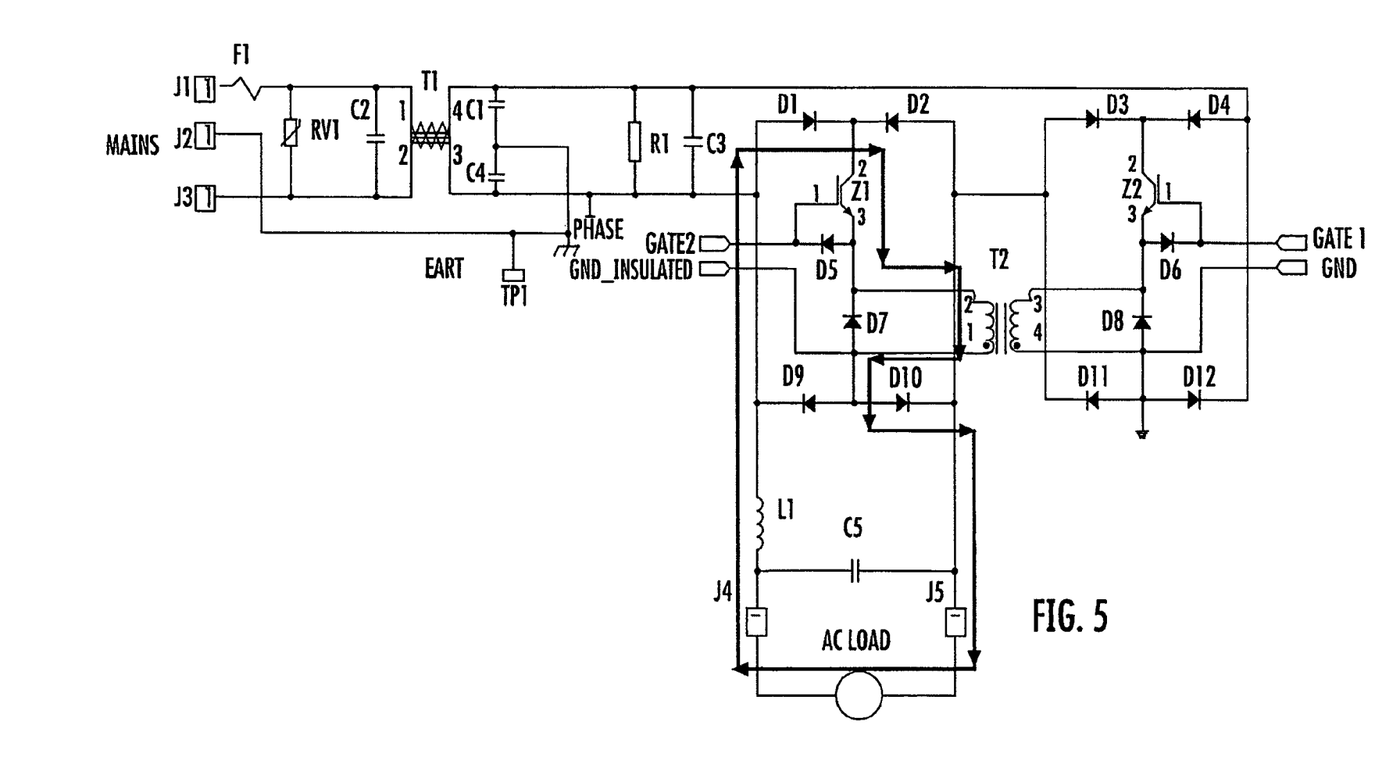
FIG. 5 depicts a current path during a Toff recirculation phase of the discharge current of the reactive energy from the load, in accordance with the present invention.

By contrast, looking at FIG. 5, during the Toff period, in which the PWM signal is low, the complementary signal of the PWM signal is high, thus the switch Z1 is in a conduction state. The arrows show the discharge current path of the energy stored in the inductance during positive halfwave of the input voltage. Even in this case, the alternative current circulation path during the negative halfwave of the input voltage is evident.

During Toff phases, Z2 is off and thus current may not flow through the respective diode bridge D8, D4, D11, D12. The switching frequency is much larger than the mains frequency (generally>=20 kHz), thus at each instant the analytical relations of the instantaneous values, previously recalled, that involve the output voltage and the PWM driving signal of the switches, hold.

By changing the parameter δ (duty cycle) of the PWM control signal, it is possible to modulate the instantaneous value of the output AC voltage (applied to the load), because it is possible to reduce more or less its value depending on the applied duty-cycle (δ), as schematically shown in FIG. 1. Because the switches of the double chopper circuit are bidirectional, as schematically shown in FIG. 2, the above considerations for positive mains voltages hold also for negative voltages.

During positive halfwaves of the voltage, the diodes crossed by currents, respectively during Ton and Toff, are: D4 and D11 during Ton (re: FIG. 4), D1 and D10 during Toff (re: FIG. 5). Similarly, during negative halfwaves of the voltage, the diodes crossed by current are D3 and D12 during Ton, D2 and D9 during Toff.

The relations that give voltage and current in function of the duty-cycle δ are:

$$v_{AA'} = \delta \cdot V_{MAX} \cdot \sin(\omega t)$$

$$i_{load} = \frac{1}{\delta} \cdot i_{ac} = \frac{1}{\delta} \cdot I_{MAX} \sin(\omega t + \varphi)$$

wherein φ is the outphasing angle between the current and the voltage.

In order to obtain a sinusoidal voltage at the mains frequency, even on a purely resistive load, it is helpful to insert a LC filter (L1 and C5) at the output of the above described switching system. By acting on the duty-cycle δ of the control signal it is possible to adjust the voltage and the power transferred to the load.

Figure 6:
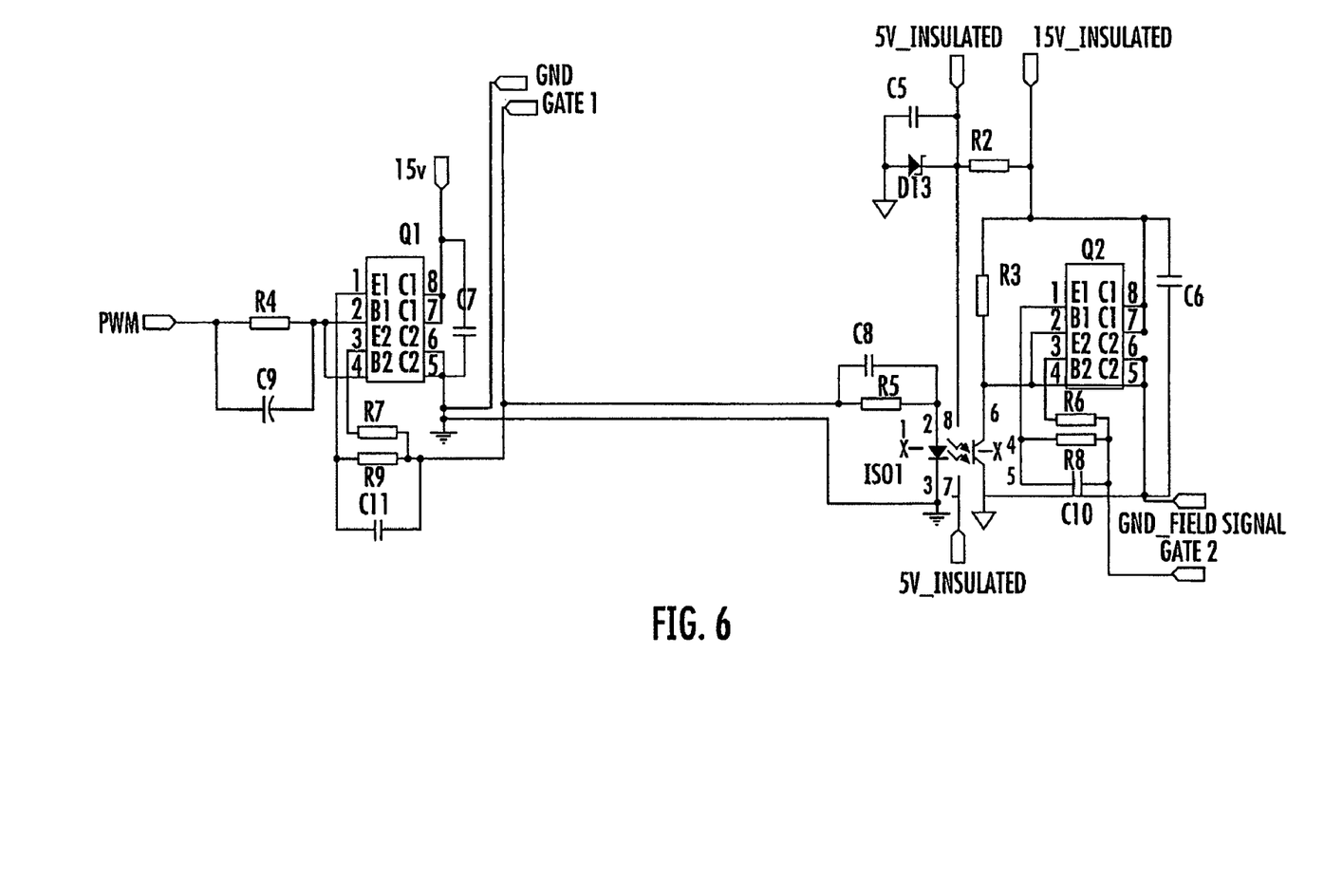
FIG. 6 is a sample embodiment of an appropriate driving circuit of the two bidirectional switches of a circuit, in accordance with the present invention.

FIG. 6 depicts a sample driving circuit of the two switches Z1 and Z2. The source of the PWM control signal with a variable duty-cycle can be indifferently implemented using discrete components or a low-cost microcontroller that may adjust the output AC voltage, for example for regulating the speed of an electric motor.

The PWM control signal is provided at the same time to the chip Q1, the output of which drives the emitting diode of a high speed photocoupler ISO1.

The chips Q1 and Q2 include a complementary pair of BJTs in push-pull configuration for driving correctly the insulated gates, of the power devices Z1 and Z2. The external components are compliant to those preferred or suggested by specifications of chips Q1 and Q2. Any skilled person will immediately identify these components and they are not described in detail for not burdening the description of embodiments. In this case, the two bipolar transistors commonly used for realizing a push-pull pair, have been substituted with a chip of the type SO1DTP06 manufactured by STMicroelectronics.

Because of the common emitter configuration of the output BJT of the optoisolator ISO1, the output signal Gate2 of the chip Q2 is complementary in respect to the PWM control signal and to the driving signal Gate1 of the switch Z2, as is helpful for the functioning of the converter.

The galvanic insulation between the two gate signals is helpful. Indeed, looking at the scheme of FIG. 3, the emitter of the switch Z2 is grounded and Z1 is at a floating potential. It might be difficult to drive correctly Z1 without establishing a galvanic insulation.

The compromise is between spacing apart the turn on edges for reducing cross conduction but accepting overvoltages of amplitudes that the devices may withstand, that cause disturbances transmitted by conduction and irradiated by the circuit during functioning, or accepting a cross conduction of a small entity for preventing overvoltages, but tolerating a power dissipation even during a functioning in open circuit configuration, because of cross conduction current peaks.

Optimization of the turn on and turn off transients, by acting on a driving circuit of the two switches, that was complicated and strongly dependent on the gate characteristics of the used device, is now accomplished by this approach, by allowing an easy and definitive equalization of the current through the two switches during switching transients.

Figure 7:
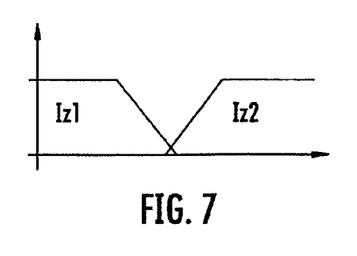
FIGS. 7 to 9 depict possible conditions in which turn on and turn off edges of the two switches cross together, in accordance with the present invention.

FIG. 7 depicts a situation in which the turn on and turn off edges of the two devices Z1 and Z2 are too distant. In this condition, the cross conduction is substantially reduced, but large overvoltages are observed on the switches during the functioning.

Figure 8:
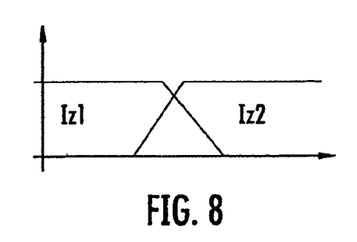

By contrast, FIG. 8 illustrates the case in which the turn on and off edges of the two devices Z1 and Z2 are too close. In this condition, there are less significant overvoltages but there is a cross conduction with relatively large peak currents.

Figure 9:
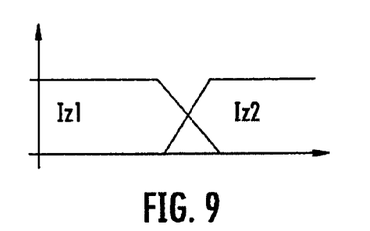

A preferred functioning condition is illustrated in FIG. 9. It is to be noticed how, by carrying out the sum instant by instant of the two currents in the switches, this sum may be constant during the transient and equal to the current before the switching instant. In practice, the first derivative of the current through Z1 while it is turning off is equal and opposite to the first derivative of the current through Z2 while it is turning on.

With this technique, the load current can be preferably switched from Z1 to Z2 without significant cross conduction and in practice with reduced overvoltages. With a circuit according to this approach, this kind of current waveform during transients is obtainable even in the presence of turn on and turn off characteristics of the two switching devices Z1 and Z2 that differ relevantly from each other.

The ferromagnetic core T2, having one coil on the primary and one coil on the secondary in the example, couples the two emitter circuits of the switches Z1 and Z2 and the coupling between the two circuits is symmetrical. The gate driving networks of the two switches are configured for obtaining a first superposition of the turn on times such to reduce overvoltages. The consequent cross conduction current peak may be limited by the interaction of the two gate meshes, as described hereinafter.

The current peak generated by the cross conduction condition in the circuit of the switch that is turning off, induces in the winding of T2 of the circuit of the other switch a voltage that delays the turn on instant of the latter. The induced voltage is limited by the zener diodes present on the windings of the core for not damaging the gates of the two switches.

Figure 10:
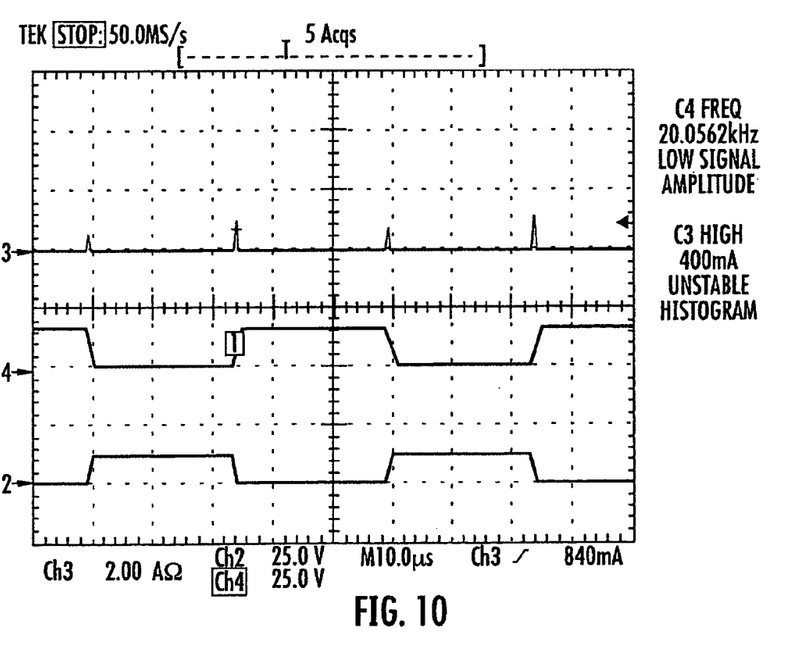
FIG. 10 depicts driving signals of the two switches and the current at the crossing sensed through the source or emitter of one of the two switches, in open output condition, according to the present invention.

A sort of current feedback is realized between the two gate meshes of the switching devices that equalizes the currents during transients. FIG. 10 shows the cross conduction current, the narrow peaks of which do not exceed 400 mA and are thus practically negligible, and the relative gate driving signals of the two switches.

Figure 11:
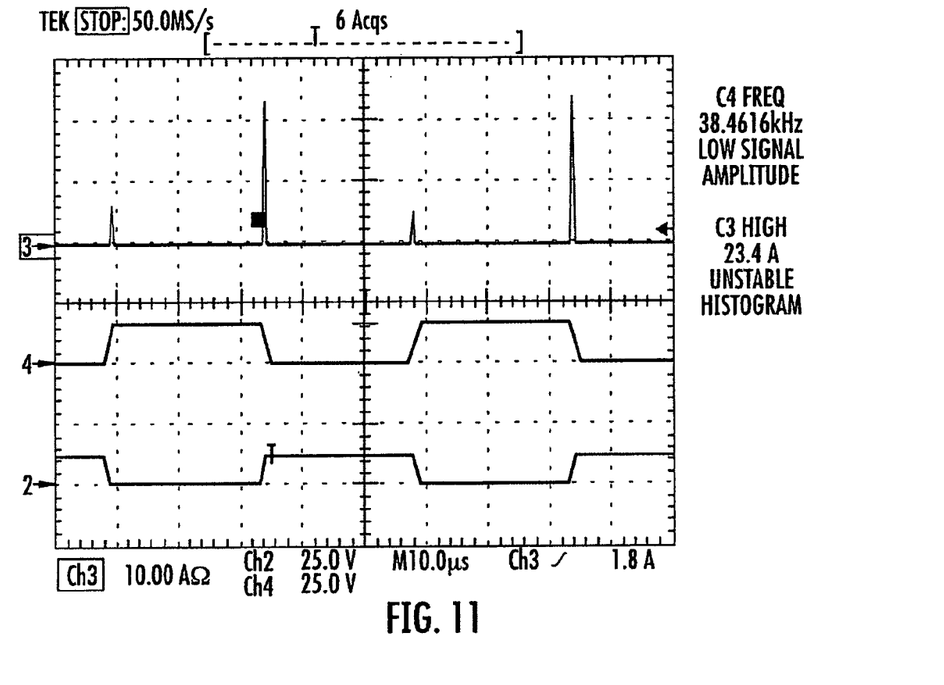
FIG. 11 compares the same parameters of FIG. 10, in case of an AC-AC converter without the magnetic coupling circuit, in accordance with the present invention.

FIG. 11 shows by comparison a simulation that highlights how, without magnetic coupling realized through T2, the cross conduction current has peaks of relevant amplitude (up to about 23.4 A) that would be undesirable, and the respective gate driving signals of the two switches.

That which is claimed is:

1. A device for transforming a primary AC voltage to a lower AC voltage for supplying an electric load, the device comprising:
    a generator to generate at least one PWM control signal;
    a first bidirectional switch to couple the electric load and the primary AC voltage during a conduction phase;
    a second bidirectional switch to discharge energy from the electric load during an off phase of said first bidirectional switch;
    a first driving circuit for said first bidirectional switch to be input with the at least one PWM control signal and to generate a first PWM signal to be applied between a control terminal and a conduction terminal of said first bidirectional switch;
    a second driving circuit for said second bidirectional switch input with the at least one PWM control signal and to generate a second PWM signal, in phase opposition with respect to the first PWM signal, to be applied between a control terminal and a conduction terminal of said second bidirectional switch;
    an electric decoupling circuit between said generator and said second driving circuit; and
    an electric decoupling and magnetic coupling transformer between respective conduction terminals of said first and second bidirectional switches.

2. A device according to claim 1, wherein said second bidirectional switch discharges by current recirculation a reactive energy from the electric load during an off phase of said first bidirectional switch.

3. A device according to claim 1, wherein at least one of said first and second bidirectional switches comprises a monodirectional switch and a full-bridge stage of power diodes coupled thereto.

4. A device according to claim 3, wherein said monodirectional switch comprises at least one of a power MOS and an IGBT device.

5. A device according to claim 1, wherein said electric decoupling circuit comprises a photocoupling diode to couple the at least one PWM control signal to said second driving circuit.

6. A device according to claim 1, wherein said electric decoupling and magnetic coupling transformer comprises a ferromagnetic core and coils associated therewith.

7. A device according to claim 1, wherein said electric decoupling and magnetic coupling transformer defines a current feedback path during a switching transient of said first and second bidirectional switches, limiting an amplitude of a current peak.

8. A device according to claim 1, wherein the device is mountable to an AC receptacle to define an AC voltage adaptor.

9. A device for transforming a primary AC voltage to a lower AC voltage for supplying an electric load, the device comprising:
    a generator to generate at least one PWM control signal;
    a first bidirectional switch to couple the electric load and the primary AC voltage during a conduction phase;
    a second bidirectional switch to discharge energy from the electric load during an off phase of said first bidirectional switch;
    a first driving circuit for said first bidirectional switch to be input with the at least one PWM control signal and to generate a first PWM signal to be applied between a control terminal and a conduction terminal of said first bidirectional switch;
    a second driving circuit for said second bidirectional switch input with the at least one PWM control signal and to generate a second PWM signal, in phase opposition with respect to the first PWM signal, to be applied between a control terminal and a conduction terminal of said second bidirectional switch;
    said first and second bidirectional switches each comprising a monodirectional switch and a full-bridge stage of power diodes coupled thereto;
    an electric decoupling circuit between said generator and said second driving circuit; and
    said electric decoupling circuit comprising a photocoupling diode to couple the at least one PWM control signal to said second driving circuit; and
    an electric decoupling and magnetic coupling transformer between respective conduction terminals of said first and second bidirectional switches.

10. A device according to claim 9, wherein said monodirectional switches each comprise at least one of a power MOS and an IGBT device.

11. A device according to claim 9, wherein said electric decoupling and magnetic coupling transformer comprises a ferromagnetic core and coils associated therewith.

12. A device according to claim 9, wherein said electric decoupling and magnetic transformer defines a current feedback path during a switching transient of said first and second bidirectional switches, limiting an amplitude of a current peak.

13. A method of limiting current peaks during switching transients of a double AC-AC chopper comprising a generator to generate at least one PWM control signal, a first bidirectional switch to couple the electric load and the primary AC voltage during a conduction phase, a second bidirectional switch to discharge energy from the electric load during an off phase of the first bidirectional switch, a first driving circuit for the first bidirectional switch to be input with the at least one PWM control signal and to generate a first PWM signal to be applied between a control terminal and a conduction terminal of the first bidirectional switch, a second driving circuit for the second bidirectional switch input with the at least one PWM control signal and to generate a second PWM signal, in phase opposition with respect to the first PWM signal, to be applied between a control terminal and a conduction terminal of the second bidirectional switch, the method comprising:
    electrically decoupling the generator and the second driving circuit;
    electrically decoupling the conduction terminal of the first bidirectional switch from the respective conduction terminal of the second bidirectional switch; and
    magnetically coupling the conduction terminal of the first bidirectional switch to the respective conduction terminal of the second bidirectional switch.

14. A method according to claim 13, wherein at least one of the first and second bidirectional switches comprises a monodirectional switch and a full-bridge stage of power diodes coupled thereto.

15. A method according to claim 13, wherein the monodirectional switch comprises at least one of a power MOS and an IGBT method.

16. A method according to claim 13, wherein the electric decoupling circuit comprises a photocoupling diode to couple the at least one PWM control signal to the second driving circuit.

17. A method according to claim 13, wherein the electric decoupling and magnetic coupling transformer comprises a ferromagnetic core and coils associated therewith.

18. A method according to claim 13, wherein the electric decoupling and magnetic coupling transformer defines a current feedback path during a switching transient of the first and second bidirectional switches, limiting an amplitude of a current peak.

* * * * *

UNITED STATES PATENT AND TRADEMARK OFFICE
CERTIFICATE OF CORRECTION

PATENT NO. : 7,973,519 B2  
APPLICATION NO. : 12/058020  
DATED : July 5, 2011  
INVENTOR(S) : Di Guardo et al.

Page 1 of 1

It is certified that error appears in the above-identified patent and that said Letters Patent is hereby corrected as shown below:

Front Page, Title — Delete: "DEVICE FOR TRANSFORMING A PRIMARY AC VOLTAGE IN A LOWER AC VOLTAGE IN A LOWER AC VOLTAGE FOR SUPPLYING AN ELECTRICAL LOAD"  
Insert: --DEVICE FOR TRANSFORMING A PRIMARY AC VOLTAGE IN A LOWER AC VOLTAGE FOR SUPPLYING AN ELECTRICAL LOAD--

Column 1, Lines 1-4 — Delete: "DEVICE FOR TRANSFORMING A PRIMARY AC VOLTAGE IN A LOWER AC VOLTAGE IN A LOWER AC VOLTAGE FOR SUPPLYING AN ELECTRICAL LOAD"  
Insert: --DEVICE FOR TRANSFORMING A PRIMARY AC VOLTAGE IN A LOWER AC VOLTAGE FOR SUPPLYING AN ELECTRICAL LOAD--

Signed and Sealed this  
Twenty-seventh Day of September, 2011

David J. Kappos  
*Director of the United States Patent and Trademark Office*